US011587241B2

(12) United States Patent
Shoeb et al.

(10) Patent No.: US 11,587,241 B2
(45) Date of Patent: Feb. 21, 2023

(54) DETECTION OF ENVIRONMENTAL CHANGES TO DELIVERY ZONE

(71) Applicant: WING Aviation LLC, Mountain View, CA (US)

(72) Inventors: Ali Shoeb, San Rafael, CA (US); Dinuka Abeywardena, Mountain View, CA (US)

(73) Assignee: Wing Aviation LLC, Mountain View, CA (US)

( * ) Notice: Subject to any disclaimer, the term of this patent is extended or adjusted under 35 U.S.C. 154(b) by 265 days.

(21) Appl. No.: 16/887,404

(22) Filed: May 29, 2020

(65) Prior Publication Data
US 2021/0374975 A1   Dec. 2, 2021

(51) Int. Cl.
| G06T 7/246 | (2017.01) |
| G06T 7/174 | (2017.01) |
| B64C 39/02 | (2023.01) |

(52) U.S. Cl.
CPC ........... *G06T 7/248* (2017.01); *B64C 39/024* (2013.01); *G06T 7/174* (2017.01); *B64C 2201/123* (2013.01); *B64C 2201/128* (2013.01); *G06T 2207/10028* (2013.01); *G06T 2207/10032* (2013.01); *G06T 2207/20081* (2013.01)

(58) Field of Classification Search
CPC ...................... G06T 7/248; G06T 7/174; G06T 2207/10028; G06T 2207/10032; G06T 2207/20081; B64C 39/024; B64C 2201/123; B64C 2201/128; G06V 10/82; G06V 20/17; G06V 2201/10; G06V 2201/12; G06V 20/10

USPC ............................................................ 701/3
See application file for complete search history.

(56) References Cited

U.S. PATENT DOCUMENTS

| 9,823,658 | B1* | 11/2017 | Loveland ............... G01C 11/02 |
| 9,854,206 | B1* | 12/2017 | Ren ......................... H04N 7/147 |
| 10,049,589 | B1 | 8/2018 | Boyd et al. |
| 10,198,955 | B1 | 2/2019 | Boyd et al. |
| 11,280,608 | B1* | 3/2022 | Zermas ................. G06T 7/0012 |
| 2015/0170526 | A1 | 6/2015 | Wang et al. |

(Continued)

FOREIGN PATENT DOCUMENTS

| EP | 3428766 A1 | 1/2019 | |
| KR | 102067875 B1 * | 1/2020 | ............. G06Q 50/10 |

OTHER PUBLICATIONS

Xiang et al, "Mini-UAV-based Remote Sensing: Techniques, Applications and Prospectives", ARIX.Org, Cornell University Library, Dec. 19, 2018.

(Continued)

*Primary Examiner* — Jerome Grant, II
(74) *Attorney, Agent, or Firm* — Christensen O'Connor Johnson Kindness PLLC (57) ABSTRACT

A technique for detecting an environmental change to a delivery zone via an unmanned aerial vehicle includes obtaining an anchor image and an evaluation image, each representative of the delivery zone, providing the anchor image and the evaluation image to a machine learning model to determine an embedding score associated with a distance between representations of the anchor image and the evaluation image within an embedding space, and determining an occurrence of the environmental change to the delivery zone when the embedding score is greater than a threshold value.

27 Claims, 8 Drawing Sheets

550

551 — PROVIDE THE EVALUATION IMAGE TO A SECOND MACHINE LEARNING MODEL THAT PROVIDES SEMANTIC SEGMENTATION OF THE EVALUATION IMAGE TO IDENTIFY ELEMENTS OF THE DELIVERY ZONE

553 — SEARCH DATABASE OF IMAGES REPRESENTATIVE OF THE DELIVERY ZONE FOR SECONDARY ANCHOR IMAGE, THE SECONDARY ANCHOR IMAGE SELECTED FROM THE DATABASE BASED ON SIMILARITY IN FIELD OF VIEW TO ANCHOR IMAGE AND EVALUATION IMAGE

555 — COMPARE EVALUATION IMAGE TO THE SECONDARY ANCHOR IMAGE BASED ON SEMANTIC SEGMENTATION PROVIDED BY THE SECOND MACHINE LEARNING MODEL TO IDENTIFY THE REGIONS OF THE DELIVERY ZONE THAT HAVE CHANGED

560

561 — DETERMINE FIRST EMBEDDING VALUE ASSOCIATED WITH THE ANCHOR IMAGE WITH THE MACHINE LEARNING MODEL

563 — SEGMENT THE EVALUATION IMAGE INTO SUBIMAGES THAT ARE PROVIDED TO THE MACHINE LEARNING MODEL TO DETERMINE CORRESPONDING EMBEDDING VALUES FOR THE SUBIMAGES

565 — DETERMINE EMBEDDING SCORES FOR THE SUBIMAGES BASED ON A DIFFERENCE IN POSITION BETWEEN THE CORRESPONDING EMBEDDING VALUES AND THE FIRST EMBEDDING VALUE OF THE ANCHOR IMAGE

567 — MAP THE EMBEDDING SCORES TO THE EVALUATION IMAGE TO DETERMINE WHETHER THE ENVIRONMENTAL CHANGE HAS OCCURRED IN ONE OR MORE REGIONS OF THE DELIVERY ZONE REPRESENTED BY THE SUBIMAGES (56) References Cited

U.S. PATENT DOCUMENTS

| | | |
|---|---|---|
| 2017/0206435 A1 | 7/2017 | Jin et al. |
| 2018/0089622 A1* | 3/2018 | Burch, V ................ G01S 19/49 |
| 2019/0041852 A1* | 2/2019 | Schubert ............. G06N 3/0454 |
| 2019/0087635 A1 | 3/2019 | Klaus |
| 2019/0392211 A1 | 12/2019 | Hartman et al. |
| 2020/0103552 A1* | 4/2020 | Phelan .................... G01W 1/10 |
| 2021/0142276 A1* | 5/2021 | Gupte ................ G06K 7/10861 |
| 2022/0058452 A1* | 2/2022 | Zhang ................. G06V 30/274 |
| 2022/0130136 A1* | 4/2022 | Ando ..................... G16H 50/20 |

OTHER PUBLICATIONS

International Search Report and Written Opinion, dated Sep. 10, 2021, in corresponding International Patent Application No. PCT/US2021/034025, 15 pages.

Schroff et al., "FaceNet: A Unified Embedding for Face Recognition and Clustering", arXiv:15030.3832, Jun. 17, 2015.

* cited by examiner

DETECTION OF ENVIRONMENTAL CHANGES TO DELIVERY ZONE

TECHNICAL FIELD

This disclosure relates generally to detection of environmental changes of a geographic area, and in particular but not exclusively, relates to use of unmanned aerial vehicles (UAVs) for detection of environmental changes to delivery zones.

BACKGROUND INFORMATION

An unmanned vehicle, which may also be referred to as an autonomous vehicle, is a vehicle capable of travel without a physically-present human operator, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for different environments. For instance, unmanned vehicles exist for operation in the air, on the ground, underwater, and in space. Unmanned aerial vehicles (UAVs) are becoming more popular in general and provide opportunities for delivery of goods between locations (e.g., from retailer to consumer).

BRIEF DESCRIPTION OF THE DRAWINGS

Non-limiting and non-exhaustive embodiments of the invention are described with reference to the following figures, wherein like reference numerals refer to like parts throughout the various views unless otherwise specified. Not all instances of an element are necessarily labeled so as not to clutter the drawings where appropriate. The drawings are not necessarily to scale, emphasis instead being placed upon illustrating the principles being described.

DETAILED DESCRIPTION

Embodiments of a system, apparatus, and method for detection of environmental changes are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "obtaining", "providing", "determining", "identifying", "analyzing", "searching", "generating", "comparing", "modifying", "receiving", "segmenting", "mapping", "displaying", "adjusting", "aborting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such as information storage, transmission, or display devices.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, embodiments of the present disclosure are not described with reference to any particular programming language. It will be appreciated that a variety of programming languages may be used to implement the teachings of the disclosure as described herein.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In general, embodiments of the disclosure are described in the context of an unmanned aerial vehicle (UAV) delivery service in which aerial images of one or more delivery zones are captured over time (e.g., by a UAV delivering parcels) and occurrences of environmental changes to the one or more delivery zones identified. Accordingly, the term "delivery zone" generically corresponds to a geographic area and may additionally be associated with a physical location where goods may be delivered or collected. The term "environmental change" corresponds to a permanent or non-permanent physical change of the geographic area with respect to time. However, it is appreciated that techniques described herein are generally applicable for detecting environmental changes to geographic areas and are not necessarily limited to the context of a UAV delivery service.

In embodiments described herein, a UAV (e.g., a delivery drone) is configured to be capable of determining whether a delivery zone being visited has changed relative to a previous point in time (e.g., when the UAV or another vehicle visited in the past). The "change" corresponds to an environmental change in which scene alterations could affect delivery success of goods by the UAV. Examples of environmental changes may include growth of a tree, addition of a building structure, and the like.

To accomplish the task of environmental change detection, the UAV employs a machine learning model that provides an embedding score associated with a distance between representations of an anchor image and an evaluation image within an embedding space. The anchor image is representative of the delivery zone at a previous point in time (e.g., previously captured by a UAV, satellite image, or otherwise) and the evaluation image is representative of a current visit captured by the UAV tasked with delivering a parcel to the delivery zone. If the embedding score exceeds a threshold value, then the anchor image and the evaluation image are deemed different suggesting an occurrence of an environmental change to the same geographic location (i.e., delivery zone) and the actions of the UAV may be adjusted appropriately (e.g., proceed with additional caution, adjust flight path, abort delivery, or the like).

Figure 1:
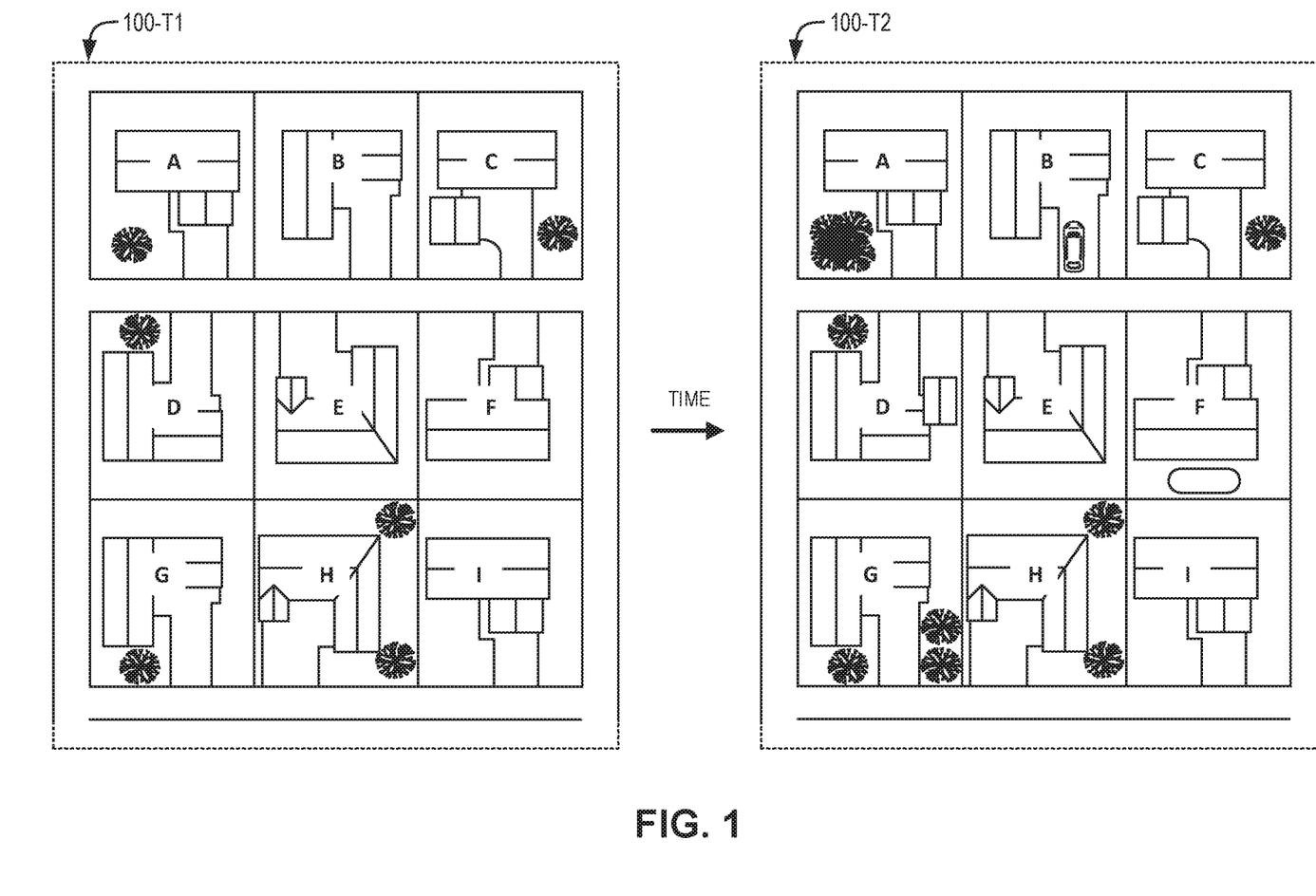
FIG. 1 illustrates an aerial map of a geographic area at different instances of time, in accordance with an embodiment of the disclosure.

FIG. 1 illustrates an aerial map of a geographic area 100 at time T1 and time T2, in accordance with an embodiment of the disclosure. The geographic area 100 is representative of an aerial view of a neighborhood 100 over which UAVs may fly to deliver a parcel at any of properties A-I (e.g., individual homes or residences within neighborhood 100). The term "property" is broadly defined herein to include not just a whole real property parcel, but also fractions of a real property parcel, premises (e.g., buildings, individual apartments in an apartment complex, etc.) or other generic physical locations (e.g., geospatial locations, coordinate locations, etc.). Accordingly, individual properties, or portions thereof, may correspond to different delivery zones.

However, over time there may be occurrences of environmental changes to neighborhood 100 that affect delivery to or collection from (e.g., by a UAV or otherwise) delivery zones located within the geographic area defined by neighborhood 100. Environmental changes include vegetation changes (e.g., growth of an existing tree or shrubbery as shown at property A, addition of vegetation as shown at property G, etc.), permanent structural changes (e.g., extension of a building as shown at property D, addition of a pool as shown at property F, etc.), non-permanent structural changes (e.g., vehicle parked on a driveway at property B, etc.), and any other physical change to a geographic area.

Figure 2:
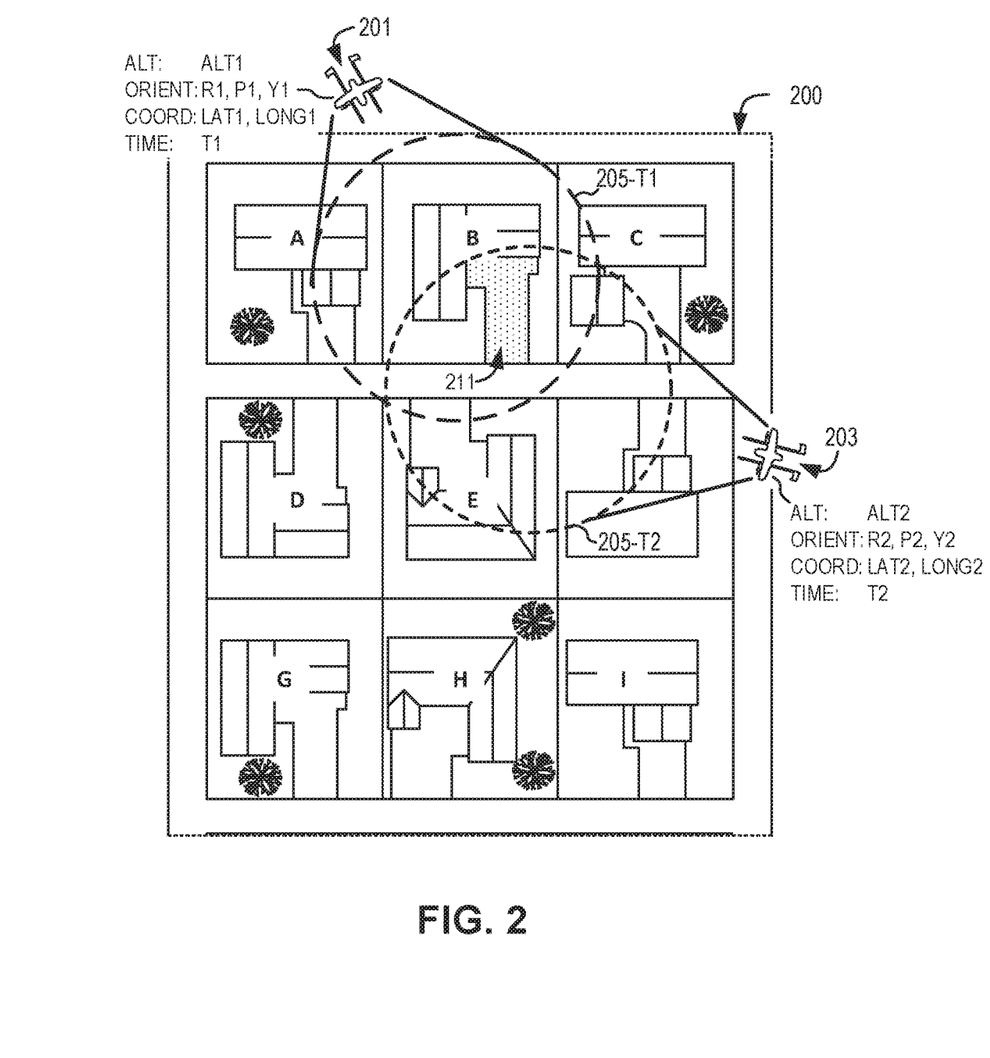
FIG. 2 illustrates UAVs capturing an image of a delivery zone at different instances of time and perspective, in accordance with an embodiment of the disclosure.

FIG. 2 illustrates UAVs capturing an image of a delivery zone at different instances of time and perspective, in accordance with an embodiment of the disclosure. In this particular instance, the geographic area corresponding to the driveway of property B in neighborhood 200 has been annotated as a delivery zone 211 for parcel delivery or collection for consumers residing within property B or otherwise associated with the physical address of property B. The annotation of delivery zone 211 as a predetermined and fixed geographic area corresponding to the driveway of property B may be determined automatically (e.g. by UAV 201 or 203 attempting to deliver to property B), manually (e.g., by the delivery service provider), or otherwise.

At time T1, UAV 201 captures a first image (e.g., an anchor image) of delivery zone 211 at a first perspective 205-T1. The anchor image captured at time T1 may correspond to a previous time a parcel was delivered to delivery zone 211, an initial evaluation time of neighborhood 200 by a delivery service provider, or more generically an earlier time relative to time T2. When delivering a parcel to delivery zone 211 at time T2, it is desirable to know whether an environmental change to delivery zone 211 has occurred relative to a previous time (e.g., time T1 or some other previous time period). Accordingly, UAV 203 captures a second image (e.g., an evaluation image for a current delivery) of delivery zone 211 at a second perspective 205-T2. The first perspective 205-T1 and the second perspective 205-T2 of delivery zone 211 may be described, at least in part, with metadata associated with the anchor and evaluation images that correspond to pose information of the UAV at time of capture (e.g., time T1 and T2). For example, the metadata may include altitude (e.g., distance above sea level), orientation (e.g., degree of roll, pitch, and/or yaw), and coordinates (e.g., latitude and longitude) of the UAV when capturing an image. In the illustrated embodiment, UAV 201 captures the anchor image of delivery zone 211 at time T1 with an altitude of ALT1, orientation of R1, P1, and Y1 for roll, pitch, and yaw, and coordinates of LAT1 and LONG1 for latitude and longitude position. Similarly, UAV 203 captures the evaluation image of delivery zone 211 at time T2 with an altitude of ALT2, orientation of R2, P2, and Y2 for roll, pitch, and yaw, and coordinates of LAT2 and LONG2 for latitude and longitude position.

In the illustrated embodiment of FIG. 2, the first perspective 205-T1 and second perspective 205-T2 are different from one another, but each cover at least in part, a common portion of the predetermined geographic area corresponding to delivery zone 211. In other embodiments, the first and second perspectives of a given delivery zone provided by the anchor image and the evaluation image may be substantially similar (e.g., any one of altitude, orientation, coordinate, or other information describing a field of view or pose of a UAV when images are captured may be within a threshold value). The anchor image and evaluation images may subsequently be compared to one another to determine whether an environmental change has occurred to delivery zone 211 over the time period between time T1 and time T2, in accordance with embodiments of the disclosure. It is further appreciated that images being compared to one another do not necessarily need to be obtained in a common manner. For example, an image captured by a UAV may be compared to an image captured by a satellite, another vehicle, an individual, and the like. In other embodiments the manner of image capture or other metadata may not be known. For example, an evaluation image captured in real-time (e.g., preceding a delivery attempt by a UAV) may be compared to an anchor image stored locally or externally of the UAV. Metadata, other than an association with a given delivery zone, of the anchor image may not be known or recorded, but the two images may be compared to determine whether an environmental change to the delivery zone has occurred, in accordance with an embodiment of the disclosure.

Figure 3:
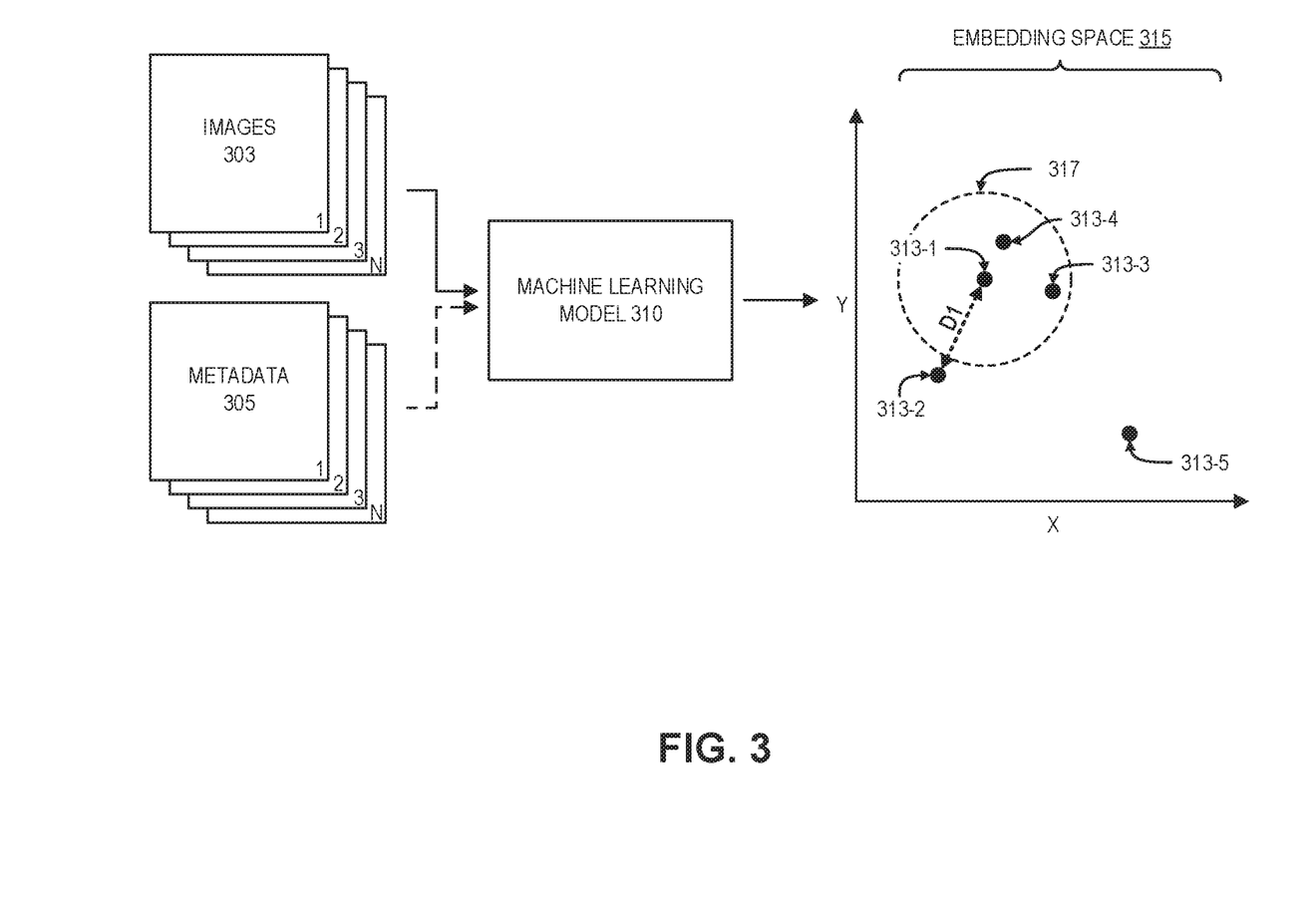
FIG. 3 illustrates a machine learning model that outputs an embedding value in response to an input image for determining an embedding score, in accordance with an embodiment of the disclosure.

FIG. 3 illustrates a machine learning model 310 that outputs embedding values 313 in response to input images 303 for determining embedding scores, in accordance with an embodiment of the disclosure. Machine learning model 310 is trained to receive input data (e.g., images, metadata, other data, or combinations thereof) and generate an output, representative of the input data, that corresponds to a position (i.e., an embedding value) within embedding space 315 that has a different dimensionality that the input data. For example, in response to receiving image 303-1, machine learning model 310 generates embedding value 313-1, which is a translation of the image 303-1 into a particular position within embedding space 315. For purposes of discussion, embedding space 315 is a two dimensional Euclidean space (e.g., designated by x and y dimensions) and while image 303-1 may be represented as input data having a dimensionality of 256×256×3. However, machine learning model 310 does not just simply translate dimensionality of an input to a different dimensionality. Rather, the distance between two points within the embedding space 315 is proportional to a degree of similarity. This may be achieved by training the machine learning model 310 using positive and negative datasets. In one embodiment, the machine learning model 310 is trained using an iterative process in which triplet pairs of images (e.g., an anchor image, a positive example image, and a negative example image) are compared. The positive example image is considered "similar" to the anchor image and the negative example image is considered "dissimilar" to the anchor image. Similar images may be image pairs that are each representative of a common delivery zone or geographic area, but may have different fields of view (i.e., different perspectives). Dissimilar images may be representative of different geographic areas or may be representative of a common delivery zone or geographic area that has had an occurrence of an environmental change. Advantageously, the machine learning model 310 will group similar images (e.g., images representative of a common delivery zone without substantial environmental changes) close together within the embedding space 315, while dissimilar images (e.g., images representative of different delivery zones or common delivery zones with substantial environmental changes) are spaced apart within the embedding space 315.

In the illustrated embodiment, image 303-1, 303-2, 303-3, and 303-4 correspond to images of a first delivery zone or geographic area taken at different times and image 303-5 corresponds to a second delivery zone of geographic area. The images 303 are input into machine learning model 310, which outputs embedding values 313 in response, each representative of a position within embedding space 315 for a respective one of the images 303. First embedding value 313-1 is associated with image 303-1, which may correspond to an anchor image that is a baseline representation of a delivery zone or geographic area. Each of the other images (e.g., images 303-2 through 303-5) may be evaluated based on a difference between their corresponding embedding values (i.e., 313-2 through 313-5) and the embedding value 313-1 to determine whether an environmental change has occurred (e.g., in the case of images 303-2 through 303-4) or whether the image is representative of a different delivery zone or geographic area (e.g., in the case of image 303-5). As illustrated a threshold value 317 corresponding to a maximum distance from embedding value 313-1 has been set. Any of the images 303 with an embedding value 313 that is less than or equal to the maximum distance, defined by threshold value 317, from embedding value 313-1 is considered "similar" and thus indicates there is not an occurrence of an environmental change to the delivery zone or geographic area represented by the anchor image (e.g., image 303-1). Any of the images 303 with an embedding value 313 that is greater than the maximum distance, defined by threshold value 317, from embedding value 313-1 is considered "dissimilar" and thus indicates that there is an occurrence of an environmental change to the delivery zone or geographic area represented by the anchor image (e.g., image 303-1) or is representative of a different geographic area than the anchor image. For example, image 303-2 has an embedding value 313-2 that is greater than the threshold value 317 and is representative, at least in part, of the same delivery zone or geographic area as anchor image 303-1. The distance D1 between embedding value 313-1 and embedding value 313-2 corresponds to an embedding score, which is greater than the threshold value 317 and thus indicative of an occurrence of an environmental change to the delivery zone or geographic area between a first timestamp (e.g., when image 303-1 of was taken) and a second timestamp (e.g., when image 303-2 was taken). The distance between embedding value 313-1 and the embedding values 313-3 or 313-4 correspond to embedding scores that are less than the threshold value 317 and thus indicative that there is not an occurrence of an environmental change of the delivery zone. It noted that images 303-1 and 303-5 are representative of different delivery zones. Accordingly, the distance between embedding value 303-1 and embedding value 303-5 is greater than the threshold value 317.

Each of the images 303 may be associated with respective metadata 305 (e.g., image 303-1 is associated with metadata 305-1, image 303-2 is associated with metadata 305-2, etc.). In some embodiments, the machine learning model 310 incorporates the metadata 305 associated with at least one of the images 303 (e.g., the anchor image 303-1 and/or any of the evaluation images 303-2 through 303-5) to determine the corresponding embedding score (e.g., distance between the embedding values of the anchor image and the evaluation image). The metadata 305 may include at least one of altitude, orientation, GPS coordinates, point-cloud information, timestamp, or other information descriptive of the corresponding images 303.

It is appreciated that the dimensionality provided from the images 303, metadata 305, and embedding space 315 is non-limiting and that other dimensionalities may be utilized (e.g., the images may not be limited to 256×256 pixels and/or the embedding space limited to two dimensions). In some embodiments the embedding space is an m-dimensional (e.g., m equals 128, 256, 512, or other integer quantity of dimensions) Euclidean space. In the same or other embodiments, an embedding score (i.e., the metric used to determine whether there has been an occurrence of an environmental change to a particular delivery zone or geographic area) corresponds to a squared Euclidean distance between respective positions within the embedding space (e.g., based on the embedding values of an anchor image and evaluation image).

Figure 4:
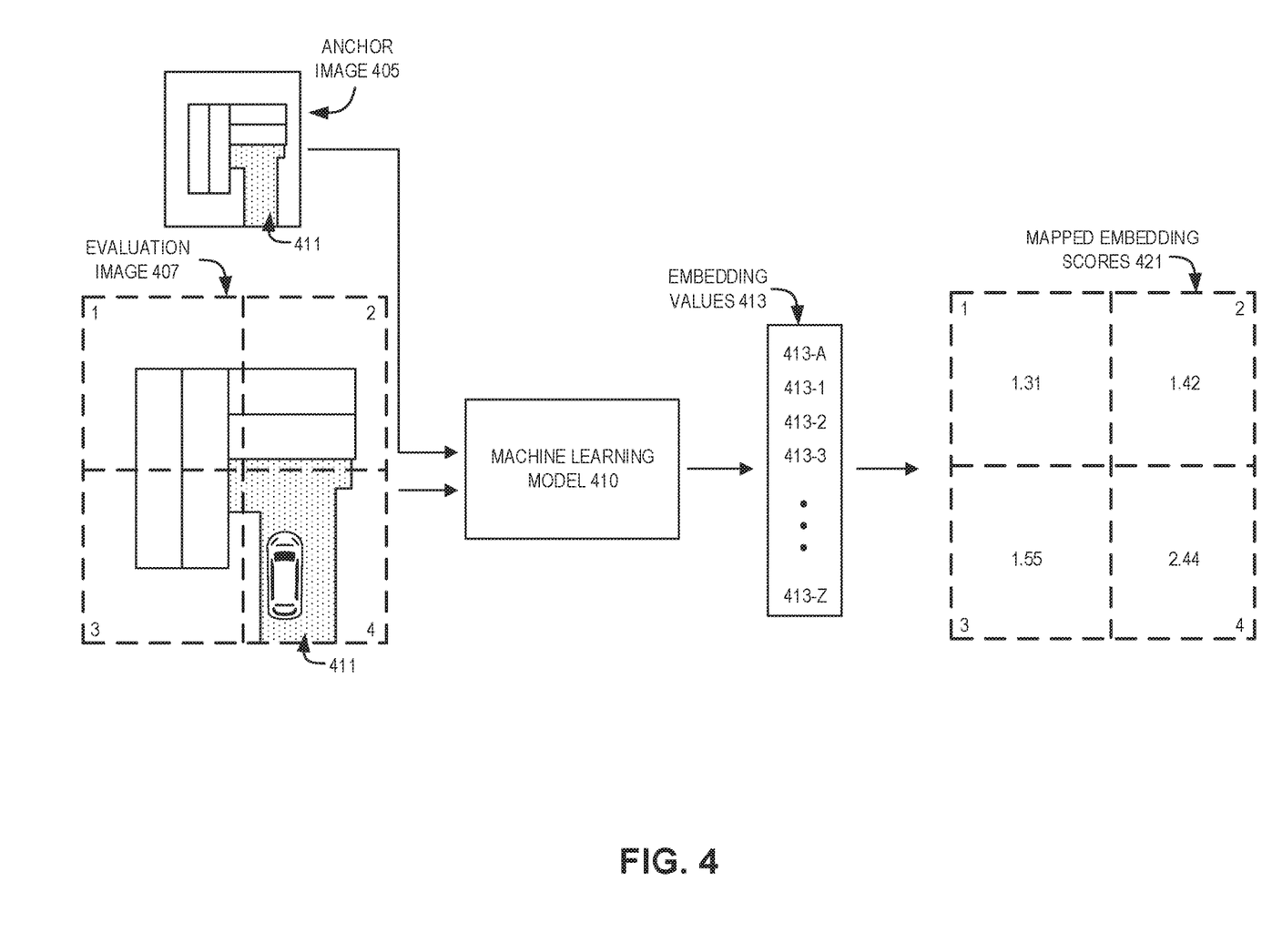
FIG. 4 illustrates embedding scores mapped to an evaluation image to determine whether an environmental change has occurred in one or more regions of a delivery zone, in accordance with an embodiment of the disclosure.

FIG. 4 illustrates embedding scores mapped to an evaluation image 421 to determine whether an environmental change has occurred in one or more regions of a delivery zone, in accordance with an embodiment of the disclosure. In the illustrated embodiment, an anchor image 405 with a first timestamp and an evaluation image 407 with a second timestamp later than the first timestamp are obtained. Both the anchor image 405 and the evaluation image 407 have a field of view that includes at least in part, a common delivery zone (e.g., driveway 411). As illustrated in FIG. 4, anchor image 405 and evaluation image 407 different by a presence of an obstruction (e.g., a vehicle) within the delivery zone 411 that may impact delivery of a parcel via a UAV. Thus, in order to promote successful parcel delivery, determination of how the delivery zone 411 has changed via comparison of the anchor image 405 and the evaluation image 407 may be beneficial. It is noted that in the illustrated embodiment of FIG. 4, anchor image 405 and evaluation image 407 share a common field of view of delivery zone 411. However, in other embodiments the anchor image 405 and the evaluation image 407 may have different fields of view, perspective, or the like. In order to determine where the delivery zone has changed (i.e., relative to the time period between the first and second timestamps), the evaluation image 407 may be segmented (e.g., into square quadrants 407-1 through 407-4 as illustrated or any other number of segments with any size or shape of individual segments).

As illustrated in FIG. 4, the anchor image 405 and each of the segments of the evaluation image 407 are input into machine learning model 410, which is one possible implementation of machine learning model 310 illustrated in FIG. 3. Referring back to FIG. 4, machine learning model 410 subsequently outputs embedding values 413 that are representative of positions within an embedding space. In particular, embedding value 413-A corresponds to the position within the embedding space that is representative of the anchor image 405 while embedding values 413-1 through 413-Z, where Z corresponds to the total number of evaluation image 407 segments, respectively correspond to segment 407-1, 407-2, 407-3, and the like.

Once the embedding values for the anchor image 405 and the segments of the evaluation image 407 are known, the embedding scores for each of the segments may be calculated. For example, the embedding scores 421 for each of the evaluation image 407 segments may be determined by calculating the squared Euclidean distance between the anchor image embedding value 413-A and each of the evaluation image segments 413-1 through 413-Z. In the illustrated embodiment, each of the embedding scores 421 are mapped to the evaluation image 407 segments to determine which regions of the evaluation image 407 have or have not had an occurrence of an environmental change. For example, segment 407-1, 407-2, 407-3, and 407-4 have respective embedding scores of 1.31, 1.42, 1.55, and 2.44. The threshold value may, for example, correspond to a value of 2.0. Thus, segments 407-1, 407-2, and 407-3 are determined to not have an occurrence of an environmental change while segment 407-4 is determined to have an occurrence of an environmental change. Since the delivery zone 411 corresponds to the driveway of the illustrated property, which is primarily contained with segment 407-1, machine learning model 410 provides information that may advantageously be utilized to identify an obstruction to parcel delivery and take appropriate action. Machine learning model 410 may similarly be utilized to determine whether an environmental change has been detected and whether said environmental change corresponds to the geographic area of a delivery zone. For example, if segment 407-1 had an embedding score indicative of an environmental change and segment 407-4 had an embedding score indicative of a lack of an environmental change, then delivery of a parcel to delivery zone 411 may be able to proceed as expected due to confirmation that the identified environmental change is not an obstruction impeding delivery of the parcel.

Figure 5A:
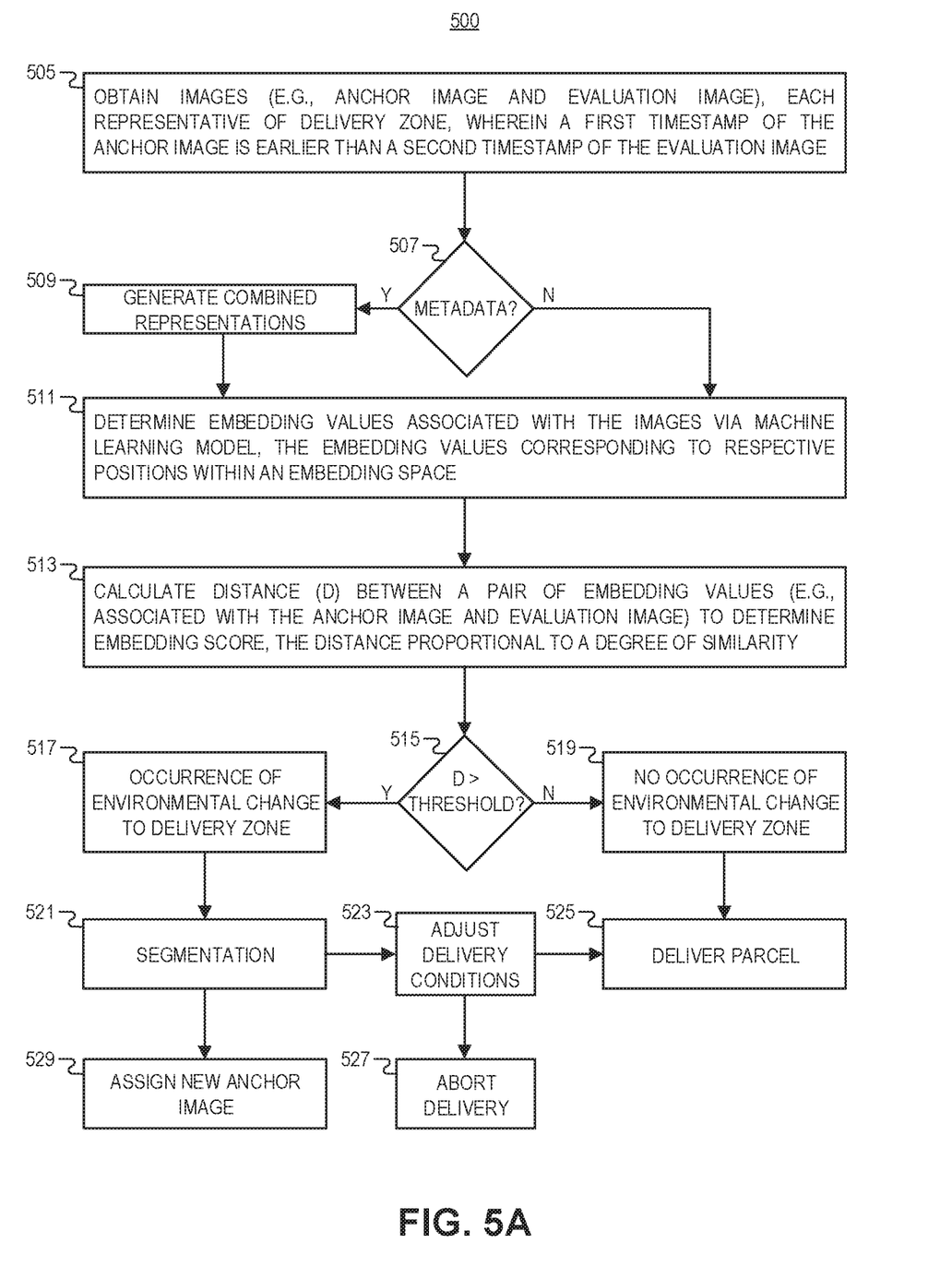
FIG. 5A illustrates a flowchart for determining an occurrence of an environmental change to a delivery zone, in accordance with an embodiment of the disclosure.
Figure 5B:
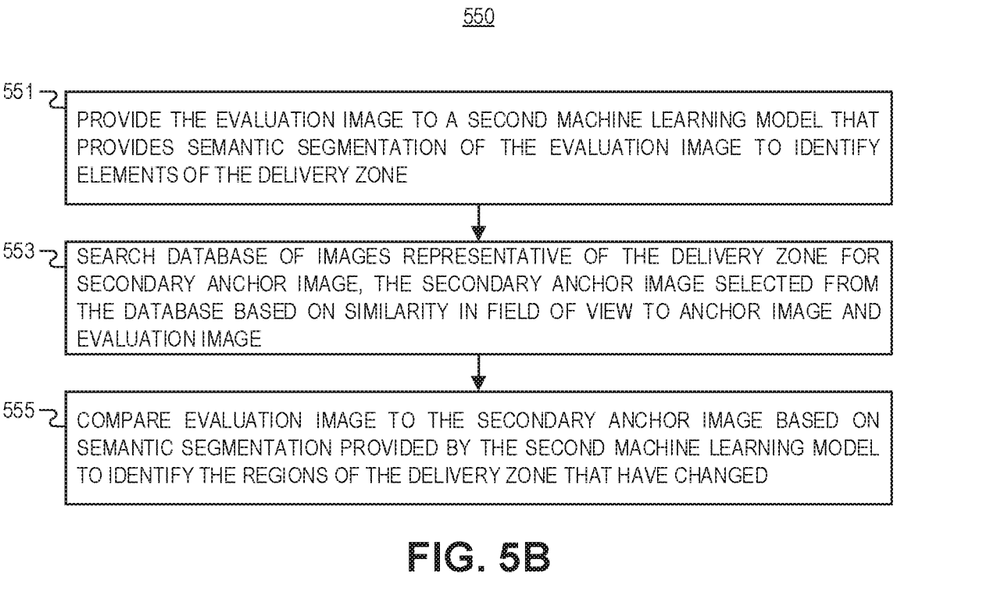
FIG. 5B and FIG. 5C illustrate flowcharts for segmenting an evaluation image to identify regions of a delivery zone that have changed, in accordance with embodiments of the disclosure.
Figure 5C:
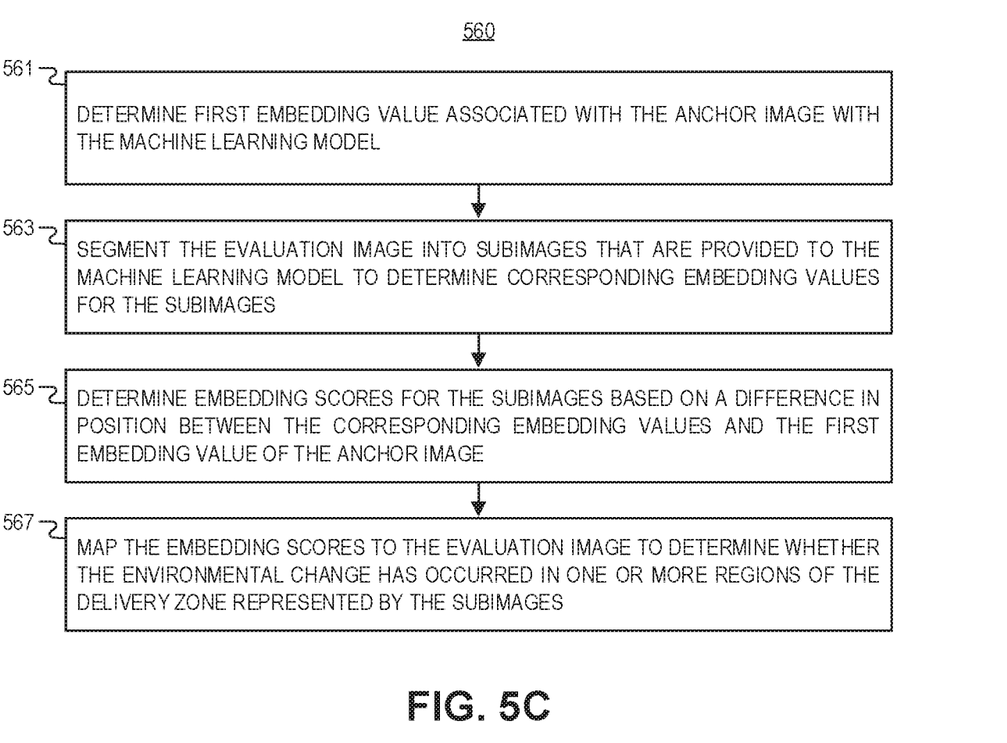

FIG. 5A, FIG. 5B, and FIG. 5C, illustrated flowcharts 500, 550, and 560 which demonstrate a process or method for detecting environmental changes to a geographic area (e.g., delivery zone), in accordance with embodiments of the disclosure. The order in which some or all of the process blocks appear in flowcharts 500, 550, and/or 560 should not be deemed limiting. Rather, one of ordinary skill in the art having the benefit of the present disclosure will understand that some of the process blocks may be executed in a variety of orders not illustrated, or even in parallel. Furthermore, several of the processing blocks depict steps that are optional and may be omitted.

FIG. 5A illustrates the flowchart 500 for determining an occurrence of an environmental change to a delivery zone, in accordance with an embodiment of the disclosure.

Block 505 shows obtaining images that are each representative of a delivery zone. A first image included in the images may be an anchor image (e.g., image 303-1 of FIG. 3 and/or image 405 of FIG. 4) having a first timestamp and a second image included in the images may be an evaluation image (e.g., any of images 303-2 through 303-N, and/or image 407 of FIG. 4) having a second timestamp different than the first timestamp. In some embodiments the first timestamp of the anchor image is earlier in time than the second timestamp of the evaluation image. In some embodiments the exact timestamp of the images may not be known, but the manner in which the images are obtained may be indicative of a general difference in time between capture. For example, the evaluation image may be captured by a UAV in substantially real time while the anchor image was obtained from a database of images. Thus, it may be known that the anchor image has an earlier timestamp than the evaluation image without explicitly knowing the first and second timestamps.

In embodiments, the images (e.g., the anchor image, the evaluation, or the like) may be obtained from the database that includes images representative of the delivery zone, obtained (e.g., captured by one or more image sensors of the UAV) from memory of the UAV and have any variety of resolution, format, compression, color depth, and the like. It is appreciated that the term "image" and/or "images" corresponds to any digital representation of a delivery zone and/or geographic area and may correspond to two-dimensional images (e.g., obtained from one or more conventional CMOS, CCD, or other type of image sensor), three-dimensional images (e.g., point cloud images obtained from one or more LIDAR cameras, time of flight cameras, or otherwise, stereo images obtained from paired image sensors, optics, or the like). The images are not limited to aerial views and may have a common perspective or different perspective (i.e., field of view) of the delivery zone or other geographic areas. The images may be captured by a variety of means including by a UAV, another vehicle, a satellite, a mobile device, or otherwise. The obtained images are selected for comparison to determine whether an occurrence of an environmental change to the delivery zone has occurred (e.g., has the geographic area representative of the delivery zone physically changed during the time period between when the anchor image was captured and when the evaluation image was captured).

Block 507 illustrates a conditional process block that indicates actions based on whether metadata associated with the images are to be utilized to generate combined representations for detecting environmental changes to the delivery zone. It is appreciated that in some embodiments the metadata of the images may not be available and/or may not be utilized for detecting environmental changes to the delivery zone. However, if metadata associated with the images (e.g., the anchor image and/or the evaluation image) is to be utilized, then block 507 proceeds to block 509 to generate combined representations of the images and the metadata. If the metadata associated with the images is not to be utilized (i.e., combined representations are not generated) then block 507 proceeds towards block 511. The use of the metadata to generate or not to generate combined representations is non-limiting and that in various embodiments of the disclosure the metadata may be used for a variety of purposes (e.g., to associate images with a given delivery zone based on GPS coordinate metadata, select images based on timestamp, and the like). The metadata may include at least one of an altitude, orientation, GPS coordinates, point-cloud information, timestamp, or other information descriptive of the images and/or the delivery zone.

Block 509 shows generating combined representations of the images and the metadata. In some embodiments, the generation of the combined representations may be accomplished by one or more machine learning models (e.g., the machine learning model that outputs embedding values as described in FIG. 3, FIG. 4, and/or FIG. 6B). In other embodiments the combined representations may be generated in advance of inputting the data (i.e., the combined representations that includes the images and the metadata) to the machine learning model. In some embodiments generating the combined representations correspond to translating a data structure (e.g., representative of the images, the metadata, or a combination thereof) from a first format to a second format such that the a given image and its corresponding metadata may be combined in an appropriate manner. In the same or other embodiments, the machine learning model that outputs embedding values (e.g., as described in FIG. 3, FIG. 4, and/or FIG. 6B) itself receives inputs corresponding to both the images and the metadata and generates the combined presentations intrinsic to the architecture of the machine learning model.

Figure 6A:
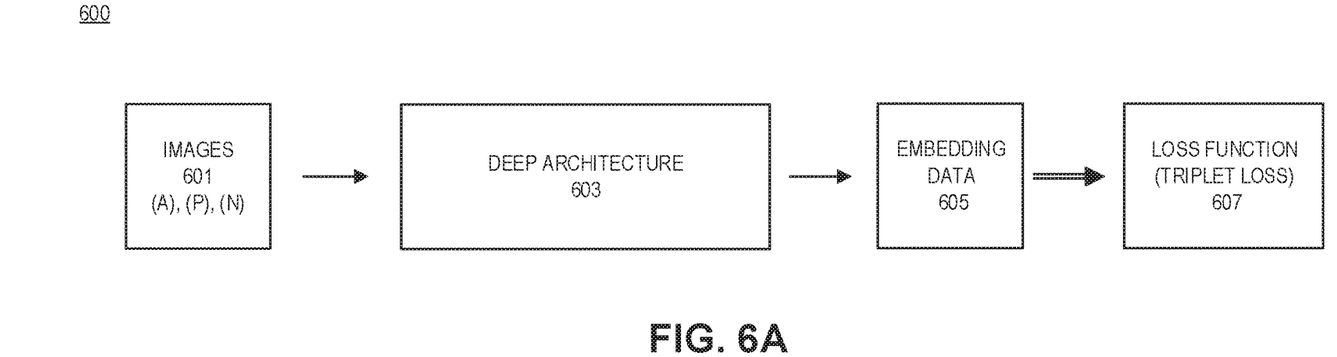
FIG. 6A and FIG. 6B illustrate example architectures of a machine learning model that outputs an embedding data in response to input data, in accordance with embodiments of the disclosure.
Figure 6B:
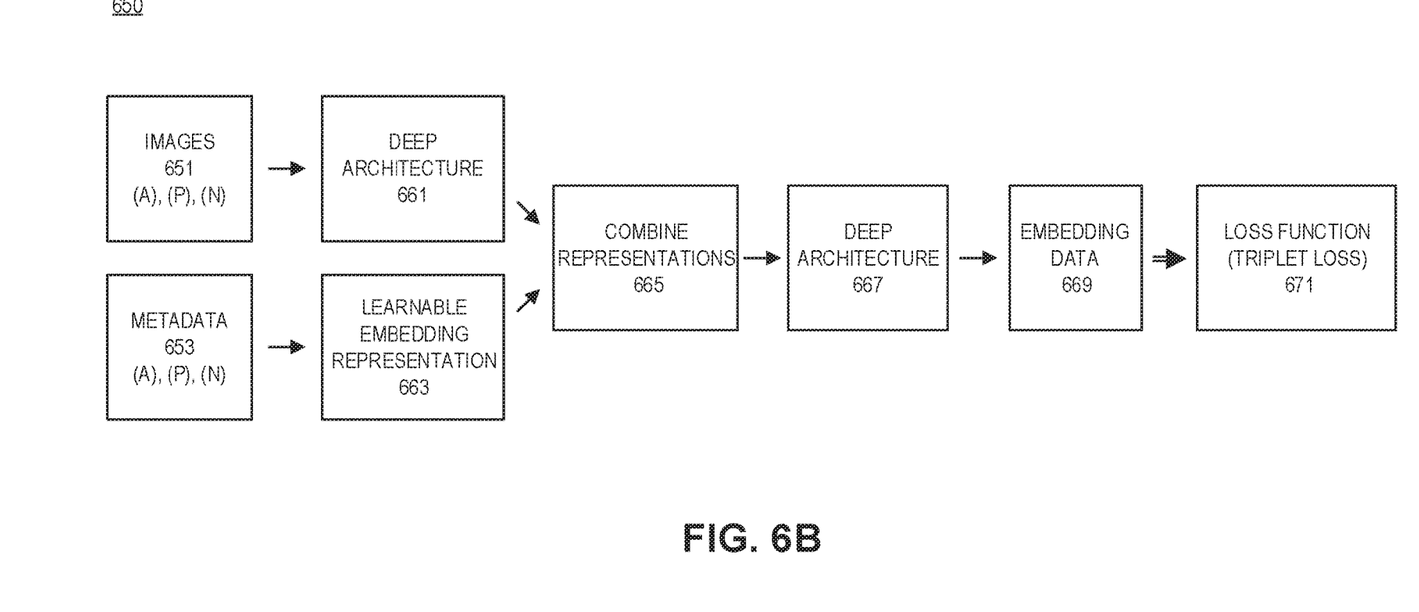

Block 511 illustrates determining embedding values associated with the images via one or more machine learning models (e.g., any of the machine learning models described in FIG. 3, FIG. 4, FIG. 6A, and/or FIG. 6B). The machine learning model receives data (e.g., an anchor image, an evaluation image, segmented images, combined representations, or the like) and outputs corresponding embedding values in response. The embedding values correspond to respective positions within an embedding space, which may be a multi-dimensional Euclidean space. For example, a first embedding value associated with the anchor image and a second embedding value associated with the evaluation image may be determined with the machine learning model.

Block 513 shows calculating a distance (D) between a pair of embedding values within the embedding space defined by the machine learning model to determine an embedding score. The distance between the pair of embedding values is proportional to a degree of similarity between the images or combined representations associated with the pair of embedding values. In some embodiments the distance (D) may correspond to a squared Euclidean distance between the pair of embedding values. In general, the distance term (D) corresponds to proportion to the positional difference between the pair of embedding values within the embedding space and may not necessarily exactly correspond to the precise distance. For example, the distance (D) may be normalized, weighted, or otherwise changed while still being representative of the positional difference.

Block 515 illustrates receiving the distance (D) between the pair of embedding values (e.g., associated with the images being compared such as the anchor image and evaluation image) and comparing to a threshold value. If (D) is greater than the threshold value or otherwise outside of a threshold range, then block 515 proceeds to block 517. If (d) is less than a threshold value or otherwise within a threshold range, then block 515 proceeds to block 519.

Blocks 517 and 519 show different actions that may be taken by a UAV dependent on whether an occurrence of an environmental change to the delivery zone is detected or not. For example, if no occurrence of an environmental change to the delivery zone is detected based on (D), then block 519 proceeds towards block 525 for delivery of the parcel being held by the UAV to the delivery zone. If an occurrence of the environmental change to the delivery zone is detected or otherwise suspected based on (D), block 517 proceeds to block 521 for segmentation to determine which regions of the delivery zone have changed.

Block 521 illustrates segmentation of evaluation to determine which regions of the delivery zone have changed and if said changes correspond to an obstruction that impedes delivery of the parcel to the delivery zone by the UAV as described in FIGS. 5B and 5C. For example, addition of a pool in the backyard of a property with a delivery zone in the driveway may not impede delivery of the parcel. However, a car in the driveway may impede delivery of the parcel to the driveway. Based on the resultant segmentation, block 521 proceeds to block 523 to adjust delivery conditions of the UAV if necessary. Additionally, if segmentation of block 521 results in the determination that there is an obstruction impeding delivery, block 521 may also proceed to block 529 in which the current evaluation image may be assigned as the anchor image for the given delivery zone such that a next occurrence of the environmental change of the delivery zone is determined with respect to the evaluation image.

Block 523 shows adjusting delivery conditions of the UAV based on the segmentation provided by block 521. For example, if an obstruction is identified, the flight path of the UAV may be adjusted to avoid the obstruction when delivering the parcel to the delivery zone. Alternatively, a second delivery zone, different from the originally targeted delivery zone, may be identified for delivering the parcel. In some embodiments, the UAV may abort delivery of the parcel entirely (e.g., in situations where an alternative delivery zone is unable to be identified, presence of unsafe conditions, or the like). Based on how the conditions of delivery of the parcel by the UAV are adjusted, then block 523 proceeds to block 525 to deliver the parcel by the UAV or block 523 proceeds to block 527 to abort delivery.

FIG. 5B and FIG. 5C illustrate flowcharts 550 and 560, respectively, for segmenting the evaluation image to identify regions of the delivery zone that have changed, in accordance with embodiments of the disclosure. Flowcharts 550 and 560 are possible implementations of block 521 of flowchart 500 illustrated in FIG. 5A.

FIG. 5B illustrates the flowchart 550 and includes process blocks 551, 553, and 555.

Block 551 includes providing the evaluation image to a second machine learning model that has been trained to provide semantic segmentation of the evaluation image to identify elements of the delivery zone. Specifically, the second machine learning model may annotate each pixel or groups of pixels of the evaluation image with a confidence value related to one or more elements (e.g., housing, vegetation, driveway, car, and the like). If the evaluation image and the anchor image have a similar field of view of the delivery zone, then then anchor image may also be input into the second machine learning model to generate semantic segmentation of the anchor image, which may be compared to the semantic segmentation of the evaluation image to determine which regions of the delivery zone has changed. For example, if a given region of the evaluation image has more pixels associated with vegetation than the anchor image, it may be indicative that said region has vegetation growth. However, if the evaluation image and the anchor image have substantially different fields of view then an alternative anchor image may need to be determined and thus block 551 proceeds to block 553.

Block 553 shows searching a database of images representative of the delivery zone for a secondary anchor image. The secondary anchor image is selected based on a similarity in field of view (i.e., perspective) to the anchor image and the evaluation image. More specifically, previous images of the delivery zone are searched that have a similar field of view (e.g., similar GPS coordinates, pose of UAV, or the like) to the evaluation image. In some embodiments, the evaluation image and the anchor image may be modified (e.g., cropped, rotated, etc.) such that a common perspective of the delivery zone is provided. Upon identification of the secondary anchor image, block 553 proceeds to block 555.

Block 555 illustrates comparing the evaluation image to the secondary image based on the semantic segmentation provided by the second machine learning model to identify regions of the delivery zone that have changed. For example, relative percentage of semantically segmented elements (e.g., house, vegetation, and the like) within the images may be compared and identify which elements of the elements have changed relative to the timestamp of the secondary anchor image and the evaluation image.

FIG. 5C illustrates the flowchart 560 and includes process blocks 561, 563, and 565, and 567. Flowchart 560 is one possible implementation of the segmentation described in FIG. 4.

Block 561 shows determining a first embedding value associated with the anchor image with the machine learning model, in accordance with embodiments of the disclosure.

Block 563 illustrates segmenting the evaluation image into subimages that are provided to the machine learning model to determine corresponding embedding values for the subimages.

Block 565 shows determining embedding scores for the subimages based on a difference in position between the corresponding embedding values and the first embedding value of the anchor image. In other words, each of the subimages may be compared to the anchor image within the embedding space defined by the machine learning model.

Block 567 illustrates mapping the embedding scores to the evaluation image to determine whether the environmental change has occurred in one or more regions of the delivery zone represented by the subimages. For example, if the embedding score of a given one of the subimages is greater than the threshold value then the associated region of the delivery zone described by that given one of the subimages has changed (i.e., occurrence of an environmental change) relative to when the anchor and evaluation images were captured.

FIG. 6A and FIG. 6B illustrate example architectures of machine learning models 600 and 650 that output embedding data in response to input data, in accordance with embodiments of the disclosure. The machine learning models 600 and 650 are possible implementations of machine learning model 310 illustrated in FIG. 3, machine learning model 410 illustrated in FIG. 4, and the machine learning model discussed in FIGS. 5A-5C, in accordance with embodiments of the disclosure.

FIG. 6A illustrates the machine learning model 600, which includes images 601 (e.g., an anchor image, a positive image, and a negative image, or any other image of one or more delivery zones, geographic areas, or the like), deep architecture 603 (e.g., an artificial deep neural network including interconnected layers of weighted and/or biased activation functions, each receiving a previous an input from a previous layer and computes and output that is provided to a subsequent layer), embedding data 605 (e.g., embedding values corresponding to a position of an input image within an embedding space). The deep architecture may include linear or non-linear activation functions that collectively form layers of the deep neural network. In some embodiments, the deep architecture 603 is a convolution neural network that includes a plurality of interspersed convolutional, pooling, and normalization layers.

During training, the parameters of the deep architecture 603 are iteratively updated (e.g., via an optimization algorithm such as gradient descent or otherwise) based, at least in part, on a loss function 607 that enforces positive pairs of images (e.g., the anchor image and the positive image pair) are closer together within the embedding space than the negative pair of images (e.g., the anchor image and the negative image pair). More specifically, the loss function 607 may enforce a distance between positive and negative pairs within the embedding space. The positive image may be representative of the same delivery zone as the anchor image without an environmental change (e.g., the anchor and positive images may correspond to different perspectives of the delivery zone). The negative image may be representative of the same delivery zone as the anchor image, but with an environmental change or the negative image may simply be a random image of a delivery zone that is not necessarily the same delivery zone as the anchor image.

In one embodiment, the loss function 607 is structured such that training is accomplished with triplets of images that includes different anchor images (A), positive images (P), and negative images (N) for each iterative training step. After inputting the images 601, deep architecture 603 outputs embedding data 605. The loss function 607 is utilized to calculate a loss value. Based on the loss value, the appropriate weights and biases of the deep architecture are adjusted to optimize (e.g., minimize or otherwise reduce over time) the loss value. This process is repeated until acceptable performance (e.g., speed, accuracy, etc.) is achieved. While the illustrated embodiment shows triplets of images are utilized to generate positive and negative pairs, in other embodiments different sets of images may be utilized with an appropriate change in the loss function. For example, different anchor images may be utilized with the positive and negative images. In other embodiments, the loss function may be structured to enforce two separate margins dependent upon the relationship between the images. For example, there may be a first pair of images that are of the same delivery zone but do not include an environmental change, a second pair of images that are of the same delivery zone but do include an environmental change, and a third pair of images that are of different delivery zones. The loss function may be structured such that the distance between embedding values associated with the first pair of images is smaller than the distance between embedding values associated with the second pair of images. Similarly, the distance between the embedding values associated with the second pair of images is smaller than the distance between embedding values associated with the third pair of images. In such an embodiment, the loss function may enable the machine learning model 600 to define an embedding space that distinguishes between images representative of the same delivery zone with different perspectives and occurrence of environmental changes to the delivery zone with greater accuracy.

FIG. 6B illustrates the machine learning model 650, which includes images 651 (e.g., an anchor image, a positive image, and a negative image, or any other image of one or more delivery zones, geographic areas, or the like), metadata 653 (e.g., altitude, orientation, GPS coordinates, point-cloud information, timestamp, or other information descriptive of the corresponding images 653), deep architecture 661 and 667 (e.g., an artificial deep neural network including interconnected layers of weighted and/or biased activation functions, each receiving a previous an input from a previous layer and computes and output that is provided to a subsequent layer), learnable embedding representation 663 (e.g., a translation or modification function that adjusts the format of the metadata 653 such that the output of deep architecture 661 and the learning embedding representation of the metadata 653 may be combined, combine representations 665 (e.g., that combines the outputs of deep architecture 661 and learnable embedding representation 663), embedding data 669 (e.g., embedding values corresponding to a position of an input image within an embedding space). During training, the machine learning model 650 may be trained by loss function 671.

The machine learning model 650 is similar to the machine learning model 600, with the caveat that the architecture of machine learning model 650 has been updated to incorporate metadata 653, in accordance with embodiments of the disclosure. As illustrated, there are at least two different deep architecture 661 and 667, which may enable sufficient weights and biases for the model to adequately incorporate metadata into generating an embedding space that may be utilized to determine whether there has been an occurrence of an environmental change to a given delivery zone. However, in other embodiments the deep architecture may have a different arrangement.

Figure 7:
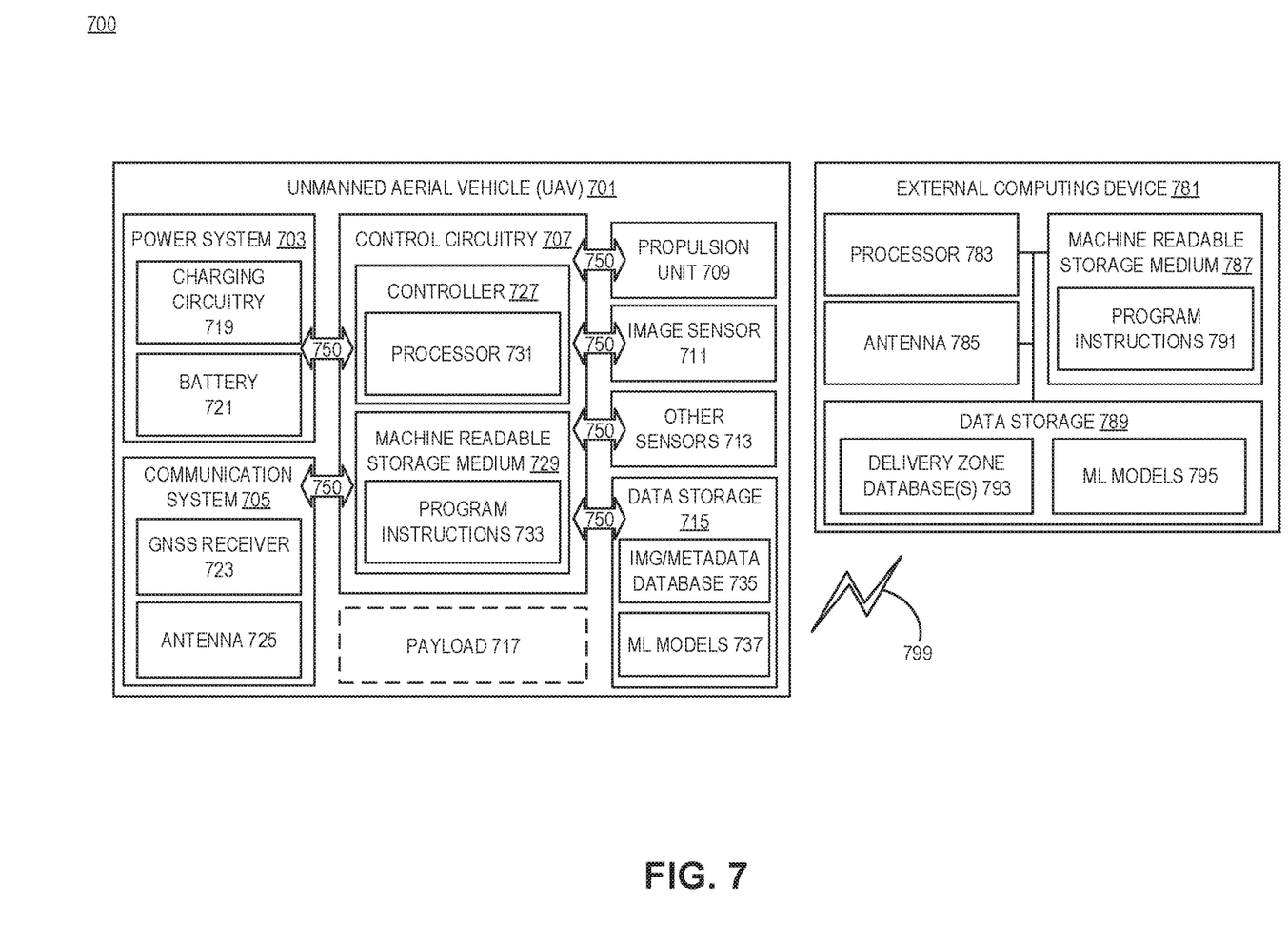
FIG. 7 illustrates a functional block diagram of a system including a UAV along with an external computing device, in accordance with an embodiment of the disclosure.

FIG. 7 illustrates a functional block diagram of a system 700 including a UAV 701 along with an external computing device 781, in accordance with an embodiment of the disclosure. System 700 may be one possible implementation of a system capable of detecting occurrences of environmental changes (e.g., described in relation to FIG. 2 through FIG. 6B). In the depicted embodiment of FIG. 7, UAV 701 includes power system 703, communication system 705, control circuitry 707, propulsion unit 709 (e.g., one or more propellers, engines, and the like to position UAV 701), image sensor 711 (e.g., one or more CMOS or other type of image sensor and corresponding lenses to capture images of geographic areas including the delivery zone), other sensors 713 (e.g., inertial measurement unit to determine pose information of the UAV, LIDAR camera, radar, and the like), data storage 715, and payload 717 (e.g., to collect and/or receive parcels). The power system 703 includes charging circuitry 719 and battery 721. The communication system 705 includes GNSS receiver 723 and antenna 725. The control circuitry 707 includes controller 727 and machine readable storage medium 729. The controller 727 includes one or more processors 731 (e.g., application specific processor, field-programmable gate array, central processing unit, graphic processing unit, tensor processing unit, and/or a combination thereof). The machine readable storage medium 729 includes program instructions 733. The data storage 715 includes a database 735 of images and/or metadata representative of one or more delivery zones, geographic regions, or the like. The data storage 715 further includes machine learning models 737 (e.g., any of the machine learning models described in relation to FIG. 2 through FIG. 6B). Each of the components of UAV 701 may be coupled (e.g., electrically) to one another via interconnects 750.

The power system 703 provides operating voltages to communication system 705, control circuitry 707, propulsion unit 709, image sensor 711, other sensors 713, data storage 715, and any other component of UAV 701. The power system 703 includes charging circuitry 703 and battery 721 (e.g., alkaline, lithium ion, and the like) to power the various components of the UAV 701. Battery 721 may be charged directly (e.g., via an external power source), inductively (e.g., via antenna 725 functioning as an energy harvesting antenna) with charging circuitry 725, and/or may be replaceable within the UAV 701 upon depletion of charge.

The communication system 705 provides communication hardware and protocols for wireless communication with external computing device (e.g., via antenna 725) and sensing of geo-spatial positioning satellites to determine the UAV 701 coordinates and altitude (e.g., via GPS, GLONASS, Galileo, BeiDou, or any other global navigation satellite system). Representative wireless communication protocols include, but are not limited to, Wi-Fi, Bluetooth, LTE, 5G, and the like.

The control circuitry 707 includes the controller 727 coupled to machine readable storage medium 729, which includes program instructions 733. When the program instructions 733 are executed by the controller 727, the system 700 is configured to perform operations based on the program instructions 733. The program instructions 733, for example, may choreograph operation of the components of the UAV 701 to detect occurrences, or lack thereof, of environmental changes to one or more delivery zones, in accordance with embodiments of the disclosure. It is appreciated that controller 727 may not show all logic modules, program instructions, or the like, all of which may be implemented in software/firmware executed on a general purpose microprocessor, in hardware (e.g., application specific integrated circuits), or a combination of both.

In some embodiments UAV 701 may be wirelessly (e.g., via communication link 799) coupled to external computing device 781 to provide external computational power via processor 783, access external databases 793 representative of images and/or metadata of delivery zones or other geographic regions, access external machine learning models 795 for detecting environmental change, segmentations, etc., or otherwise support UAV 701. External computing device 781 includes antenna 785 for communication with UAV 701. Processor 783 choreographs operation of external computing device 781 based on program instructions 791 included in machine readable storage medium 787.

It is appreciated that the machine readable storage medium 729, data storage 715, machine readable storage medium 787, and data storage 789 are non-transitory machine-readable storage mediums that may include, without limitation, any volatile (e.g., RAM) or non-volatile (e.g., ROM) storage system readable by components of system 700. It is further appreciated that system 700 may not show all logic modules, program instructions, or the like. All of which may be implemented in software/firmware executed on a general purpose microprocessor, in hardware (e.g., application specific integrated circuits), or a combination of both.

It should be understood that references herein to an "unmanned" aerial vehicle or UAV can apply equally to autonomous and semi-autonomous aerial vehicles. In a fully autonomous implementation, all functionality of the aerial vehicle is automated; e.g., pre-programmed or controlled via real-time computer functionality that responds to input from various sensors and/or predetermined information. In a semi-autonomous implementation, some functions of an aerial vehicle may be controlled by a human operator, while other functions are carried out autonomously. Further, in some embodiments, a UAV may be configured to allow a remote operator to take over functions that can otherwise be controlled autonomously by the UAV. Yet further, a given type of function may be controlled remotely at one level of abstraction and performed autonomously at another level of abstraction. For example, a remote operator may control high level navigation decisions for a UAV, such as specifying that the UAV should travel from one location to another (e.g., from a warehouse in a suburban area to a delivery address in a nearby city), while the UAV's navigation system autonomously controls more fine-grained navigation decisions, such as the specific route to take between the two locations, specific flight control inputs to achieve the route and avoid obstacles while navigating the route, and so on.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method for detecting an environmental change to a delivery zone via an unmanned aerial vehicle (UAV), the method comprising:
    obtaining an anchor image and an evaluation image, each representative of the delivery zone, and wherein a first timestamp of the anchor image is earlier than a second timestamp of the evaluation image;
    providing the anchor image and the evaluation image to a machine learning model to determine an embedding score associated with a distance between representations of the anchor image and the evaluation image within an embedding space, and wherein the distance is proportional to a degree of similarity between the anchor image and the evaluation image, wherein the machine learning model incorporates metadata associated with at least one of the anchor image or the evaluation image to determine the embedding score; and
    determining an occurrence of the environmental change to the delivery zone when the embedding score is greater than a threshold value.

2. The computer-implemented method of claim 1, wherein the delivery zone corresponds to a predetermined geographic area, wherein the anchor image and the evaluation image respectively provide a first perspective and a second perspective, each including, at least in part, the predetermined geographic area, and wherein the first perspective is different than the second perspective.

3. The computer-implemented method of claim 2, wherein the first perspective provided by the anchor image and the second perspective provided by the evaluation image differ by at least one of altitude, orientation, or GPS coordinates when captured.

4. The computer-implemented method of claim 1, wherein the anchor image and the evaluation image are point cloud images.

5. The computer-implemented method of claim 1, wherein the metadata includes at least one of altitude, orientation, GPS coordinates, point-cloud information, or timestamp.

6. The computer-implemented method of claim 1, further comprising:
    providing first metadata and second metadata, each included in the metadata, to the machine learning model, wherein the first metadata is associated with the anchor image, and wherein the second metadata is associated with the evaluation image;
    generating a first combined representation of the first metadata and the anchor image with the machine learning model; and
    generating a second combined representation of the second metadata and the evaluation image with the machine learning model.

7. The computer-implemented method of claim 6, further comprising:
    determining a first embedding value associated with the anchor image based, at least in part, on the first combined representation with the machine learning model;
    determining a second embedding value associated with the evaluation image based, at least in part, on the second combined representation with the machine learning model, wherein the first embedding value and the second embedding value correspond to respective positions within the embedding space.

8. The computer-implemented method of claim 7, wherein the embedding space is an m-dimensional Euclidean space, and wherein the embedding score corresponds to a squared Euclidean distance between the respective positions.

9. The computer-implemented method of claim 1, further comprising:
determining a first embedding value associated with the anchor image with the machine learning model;
segmenting the evaluation image into subimages that are provided to the machine learning model to determine corresponding embedding values for the subimages, wherein the first embedding value and the corresponding embedding values correspond to respective positions within the embedding space;
determining embedding scores for the subimages based on a difference in position between the corresponding embedding values and the first embedding value of the anchor image; and
mapping the embedding scores to the evaluation image to determine whether the environmental change has occurred in one or more regions of the delivery zone represented by the subimages.

10. The computer-implemented method of claim 1, further comprising:
assigning the evaluation image to correspond to the anchor image when the embedding score is greater than the threshold value such that a next occurrence of the environmental change of the delivery zone is determined with respect to the evaluation image.

11. The computer-implemented method of claim 1, wherein the environmental change corresponds to an obstruction impeding delivery of a parcel to the delivery zone via the UAV.

12. The computer-implemented method of claim 11, further comprising:
adjusting a flight path of the UAV to avoid the obstruction when delivering the parcel to the delivery zone; or
identifying a secondary delivery zone, different than the delivery zone, for delivering the parcel; or
aborting the delivery of the parcel.

13. The computer-implemented method of claim 1, further comprising:
providing the evaluation image to a second machine learning model that provides semantic segmentation of the evaluation image to identify which regions of the delivery zone have changed.

14. The computer-implemented method of claim 13, further comprising:
searching a database of images representative of the delivery zone for a secondary anchor image, wherein the secondary anchor image is selected from the database based on similarity in field of view to the anchor image and the evaluation image determined, at least in part, by metadata associated with the images included in the database and the metadata associated with at least one of the anchor image or the evaluation image.

15. The computer-implemented method of claim 14, further comprising:
comparing the evaluation image to the secondary anchor image based on the semantic segmentation provided by the second machine learning model to identify the regions of the delivery zone that have changed.

16. A non-transitory computer-readable storage medium having instructions stored thereon that, in response to execution by one or more processors of a computing system, cause the computing system to perform actions comprising:
obtaining an anchor image and an evaluation image, each representative of a delivery zone, and wherein a first timestamp of the anchor image is earlier than a second timestamp of the evaluation image;
providing the anchor image and the evaluation image to a machine learning model to determine an embedding score associated with a distance between representations of the anchor image and the evaluation image within an embedding space, and wherein the distance is proportional to a degree of similarity between the anchor image and the evaluation image; and
determining an occurrence of an environmental change to the delivery zone when the embedding score is greater than a threshold value.

17. The non-transitory computer-readable storage medium of claim 16, wherein the delivery zone corresponds to a predetermined geographic area, wherein the anchor image and the evaluation image respectively provide a first perspective and a second perspective, each including, at least in part, the predetermined geographic area, and wherein the first perspective is different than the second perspective.

18. The non-transitory computer-readable storage medium of claim 16, wherein the anchor image and the evaluation image are point cloud images.

19. A non-transitory computer-readable storage medium having instructions stored thereon that, in response to execution by one or more processors of a computing system, cause the computing system to perform actions comprising:
obtaining an anchor image and an evaluation image, each representative of the delivery zone, and wherein a first timestamp of the anchor image is earlier than a second timestamp of the evaluation image;
providing the anchor image and the evaluation image to a machine learning model to determine an embedding score associated with a distance between representations of the anchor image and the evaluation image within an embedding space, and wherein the distance is proportional to a degree of similarity between the anchor image and the evaluation image, wherein the machine learning model incorporates metadata associated with at least one of the anchor image or the evaluation image to determine the embedding score; and
determining an occurrence of the environmental change to the delivery zone when the embedding score is greater than a threshold value.

20. The non-transitory computer-readable storage medium of claim 19, wherein the metadata includes at least one of altitude, orientation, GPS coordinates, point-cloud information, or timestamp.

21. The non-transitory computer-readable storage medium of claim 19, the actions further comprising:
providing first metadata and second metadata, each included in the metadata, to the machine learning model, wherein the first metadata is associated with the anchor image, and wherein the second metadata is associated with the evaluation image;
generating a first combined representation of the first metadata and the anchor image with the machine learning model; and generating a second combined representation of the second metadata and the evaluation image with the machine learning model.

22. The non-transitory computer-readable storage medium of claim 21, the actions further comprising:
determining a first embedding value associated with the anchor image based, at least in part, on the first combined representation with the machine learning model;
determining a second embedding value associated with the evaluation image based, at least in part, on the second combined representation with the machine learning model,
wherein the first embedding value and the second embedding value correspond to respective positions within the embedding space.

23. The computer-implemented method of claim 22, wherein the embedding space is an m-dimensional Euclidean space, and wherein the embedding score corresponds to a squared Euclidean distance between the respective positions.

24. A non-transitory computer-readable storage medium having instructions stored thereon that, in response to execution by one or more processors of a computing system, cause the computing system to perform actions comprising:
obtaining an anchor image and an evaluation image, each representative of a delivery zone, and wherein a first timestamp of the anchor image is earlier than a second timestamp of the evaluation image;
providing the anchor image and the evaluation image to a machine learning model to determine embedding scores associated with distances between representations of the anchor image and the evaluation image within an embedding space;
determining a first embedding value associated with the anchor image with the machine learning model;
segmenting the evaluation image into subimages that are provided to the machine learning model to determine corresponding embedding values for the subimages, wherein the first embedding value and the corresponding embedding values correspond to respective positions within the embedding space;
determining embedding scores for the subimages based on differences in position between the corresponding embedding values and the first embedding value of the anchor image, wherein the differences in position are proportional to degrees of similarity between the anchor image and the subimages of the evaluation image; and
mapping the embedding scores to the evaluation image to determine whether the environmental change has occurred in one or more regions of the delivery zone represented by the subimages when one or more of the embedding scores are greater than a threshold value.

25. A non-transitory computer-readable storage medium having instructions stored thereon that, in response to execution by one or more processors of a computing system, cause the computing system to perform actions comprising:
obtaining an anchor image and an evaluation image, each representative of a delivery zone, and wherein a first timestamp of the anchor image is earlier than a second timestamp of the evaluation image;
providing the anchor image and the evaluation image to a machine learning model to determine an embedding score associated with a distance between representations of the anchor image and the evaluation image within an embedding space, and wherein the distance is proportional to a degree of similarity between the anchor image and the evaluation image; and
determining an occurrence of an environmental change to the delivery zone when the embedding score is greater than a threshold value; and
providing the evaluation image to a second machine learning model that provides semantic segmentation of the evaluation image to identify which regions of the delivery zone have changed.

26. The non-transitory computer-readable storage medium of claim 25, the actions further comprising:
searching a database of images representative of the delivery zone for a secondary anchor image, wherein the secondary anchor image is selected from the database based on similarity in field of view to the anchor image and the evaluation image determined, at least in part, by metadata associated with the images included in the database, the anchor image, and the evaluation image.

27. The non-transitory computer-readable storage medium of claim 26, the actions further comprising:
comparing the evaluation image to the secondary anchor image based on the semantic segmentation provided by the second machine learning model to identify the regions of the delivery zone that have changed.

* * * * *